US007742505B2

(12) United States Patent
Venters et al.

(10) Patent No.: US 7,742,505 B2
(45) Date of Patent: Jun. 22, 2010

(54) SYSTEMS AND METHODS FOR ENABLING CLOCK SIGNAL SYNCHRONIZATION

(75) Inventors: Walter Stuart Venters, Huntsville, AL (US); Troy Wayne White, Toney, AL (US); Daniel Patrick Day, Huntsville, AL (US); Richard Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 770 days.

(21) Appl. No.: 11/639,401

(22) Filed: Dec. 14, 2006

(65) Prior Publication Data

US 2007/0153811 A1 Jul. 5, 2007

Related U.S. Application Data

(60) Provisional application No. 60/750,152, filed on Dec. 14, 2005, provisional application No. 60/849,093, filed on Oct. 3, 2006.

(51) Int. Cl.
*H04J 3/06* (2006.01)

(52) U.S. Cl. ................................ 370/503; 370/395.62

(58) Field of Classification Search ................ 370/503, 370/507, 508, 509, 510, 512, 516, 517, 518, 370/519, 395.62

See application file for complete search history.

(56) References Cited

U.S. PATENT DOCUMENTS

| | | | | |
|---|---|---|---|---|
| 6,278,718 | B1 | 8/2001 | Eschholz | |
| 6,339,584 | B1 | 1/2002 | Gross et al. | |
| 6,542,754 | B1 * | 4/2003 | Sayers et al. | 455/502 |
| 6,556,573 | B1 * | 4/2003 | Kaaresoja | 370/395.64 |
| 6,658,025 | B2 | 12/2003 | Mauritz et al. | |
| 6,747,996 | B2 | 6/2004 | Holloway et al. | |
| 6,826,123 | B1 | 11/2004 | Herring | |
| 7,023,883 | B1 | 4/2006 | Lui et al. | |
| 7,079,554 | B2 | 7/2006 | Peled | |
| 7,139,923 | B1 | 11/2006 | Chapman et al. | |
| 7,200,158 | B2 | 4/2007 | Gustin | |
| 2004/0125824 | A1 | 7/2004 | Preston et al. | |
| 2004/0223518 | A1 | 11/2004 | Repko et al. | |

(Continued)

OTHER PUBLICATIONS

IEEE Standards, 1588, "IEEE Standard for a Precision Clock Synchronization Protocol for Networked Measurement and Control Systems," 2002, pp. 10-15.

(Continued)

*Primary Examiner*—Chi H. Pham
*Assistant Examiner*—Kevin Mew
(74) *Attorney, Agent, or Firm*—Lanier Ford Shaver & Payne, P.C.; Jon E. Holland

(57) ABSTRACT

An interworking function (IWF) is coupled to a switch of a packet network and communicates with the network switch based on an Ethernet clock signal or some other type of clock signal. A primary reference clock (PRC) of the network generates a PRC signal, and a timing analyzer determines timing information indicative of timing relationships between the Ethernet clock signal and the PRC signal. The timing analyzer periodically transmits such timing information, and the IWF uses the timing information to generate a PRC signal that is traceable to the network PRC signal.

35 Claims, 9 Drawing Sheets

U.S. PATENT DOCUMENTS

2004/0264477 A1 12/2004 Repko et al.
2004/0264478 A1 12/2004 Van Der Valk et al.
2005/0053076 A1 3/2005 Repko et al.
2005/0186933 A1 8/2005 Trans
2007/0041324 A1 * 2/2007 Shenoi ....................... 370/235
2007/0097902 A1 * 5/2007 Aweya et al. ............... 370/321
2007/0097947 A1 * 5/2007 Aweya et al. ............... 370/350
2007/0116060 A1 5/2007 Qu
2008/0112437 A1 * 5/2008 Kramer et al. .............. 370/503
2008/0212619 A1 * 9/2008 Scott et al. .................. 370/503

OTHER PUBLICATIONS

Venters, et al., U.S. Appl. No. 12/061,480, entitled, "Systems and Methods for Passing Timing Information Over Packet Networks," filed Apr. 2, 2008.
Goodson, et al., U.S. Appl. No. 12/061,480, entitled, "Systems and Methods for Maintaining Timestamp Synchronization . . . ," filed May 15, 2008.
ITU, International Telecommunication Union, "Timing and Synchronization Aspects in Packet Networks," May 2006.

* cited by examiner

SYSTEMS AND METHODS FOR ENABLING CLOCK SIGNAL SYNCHRONIZATION

CROSS REFERENCE TO RELATED APPLICATIONS

This application claims priority to U.S. Provisional Application No. 60/750,152, entitled "System and Method for Implementing Synchronous Ethernet," and filed on Dec. 14, 2005, which is incorporated herein by reference. This application also claims priority to U.S. Provisional Application No. 60/849,093, entitled "System and Method for Implementing Synchronous Ethernet," and filed on Oct. 3, 2006, which is incorporated herein by reference.

RELATED ART

An interworking function (IWF) is often interfaced with a packet network, such as an Internet Protocol (IP) network, and serves as an intermediary between the protocol of the packet network and the protocol of other equipment using the packet network for data communication. The IWF is generally responsible for converting data from one protocol to another to enable communication via the packet network. For example, a first IWF, referred to hereafter as the "source IWF," interfaced with a packet network may receive a data signal, such as a Ti signal, and packetize data from this signal, referred to as the "original data signal," into data packets that are compatible with the packet network. The source IWF may then transmit the data packets to the network, which routes the packets to a second IWF, referred to hereafter as the "destination IWF." The destination IWF extracts the data from the received packets and, based on the extracted data, regenerates the original data signal to provide a regenerated data signal that is synchronous to the original data signal. The regenerated data signal is then transmitted by the destination IWF to other equipment that further process the regenerated signal. Thus, using the packet network, the original data signal is effectively transmitted over the packet network from the source IWF to the destination IWF. Note that the IWFs may transmit data over the network in the opposite direction.

To enable the destination IWF to regenerate the original data signal, timing information about the original data signal is transmitted to destination IWF, which uses such information to ensure that the regenerated signal is at the same rate as and synchronous to the original data signal. In this regard, the original data signal is communicated using a clock signal, sometimes referred to as a "service clock signal." The source IWF is configured to recover the service clock signal from the original data signal and then generate timing packets that include information about the timing of the service clock signal with respect to a primary reference clock (PRC) signal. In this regard, a PRC signal is a clock signal that is generated by a highly accurate clock, referred to as primary reference clock (PRC). Due to its high degree of accuracy, a PRC signal can serve as a frame of reference for conveying timing information about a first clock signal to enable generation, at a remote location, of a clock signal that is guaranteed to be synchronous to the first clock signal. A primary reference clock is sometimes an atomic clock or a clock that uses global positioning system (GPS) signals to maintain a high degree of accuracy. G.811, which is incorporated herein by reference, sets forth current specifications for a primary reference clock.

If both the source and the destination IWFs have access to a PRC signal, then the destination IWF, based on the timing packets transmitted by the source IWF, can regenerate the service clock signal that is used to communicate the original data signal to the source IWF. In this regard, the timing packets indicate the timing of transitions of the service clock signal with respect to a PRC signal to which the source IWF has access. Using well-known techniques, the destination IWF, based on such timing information and a PRC signal to which the destination IWF has access, can then generate a clock signal that is synchronized with the service clock signal. Using this clock signal as a service clock signal for communicating data from the data packets, the destination IWF effectively regenerates the data signal originally received by the source IWF.

Unfortunately, the source and destination IWFs do not always have access to a PRC, and other techniques must be used to enable synchronization between the original data signal at the source IWF and the regenerated data signal at the destination IWF. One proposed technique for enabling synchronization of IWFs that do not have access to a PRC is to phase lock, to PRC signals from primary reference clocks internal to the packet network, clock signals used for communication with the packet network. For example, an Ethernet clock signal used to communicate data between the packet network and either the source or destination IWF can be phase locked to a PRC internal to the packet network. In such a situation, the Ethernet clock signal can then be used as a frame of reference for conveying timing information. However, phase locking an Ethernet clock signal to a PRC signal has various drawbacks, including employing specialized circuitry for enabling such phase locking to occur. In addition, modification to existing designs of network switches may be required to enable the network to provide the timing information used by the IWF to phase lock to the PRC signal.

Moreover, other techniques for enabling a source IWF and a destination IWF to remain synchronized without requiring their respective Ethernet clock signals to be phase locked to a PRC clock signal are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for enabling clock signal synchronization. In accordance with an exemplary embodiment of the present disclosure, an interworking function (IWF) is coupled to a switch of a packet network, such as an Internet Protocol (IP) network, and communicates with the network switch based on an Ethernet clock signal or some other type of clock signal. A primary reference clock (PRC) of the network generates a PRC signal, and a timing analyzer provides timing information indicative of timing relationships between the Ethernet clock signal and the PRC signal. In one exemplary embodiment, the timing analyzer periodically transmits such timing information, and the IWF uses the timing information to generate a PRC signal that is traceable to the network PRC signal. Thus, the IWF has access to a PRC signal that can be used for various purposes, such as synchronization with a remote IWF according to known techniques.

Figure 1:
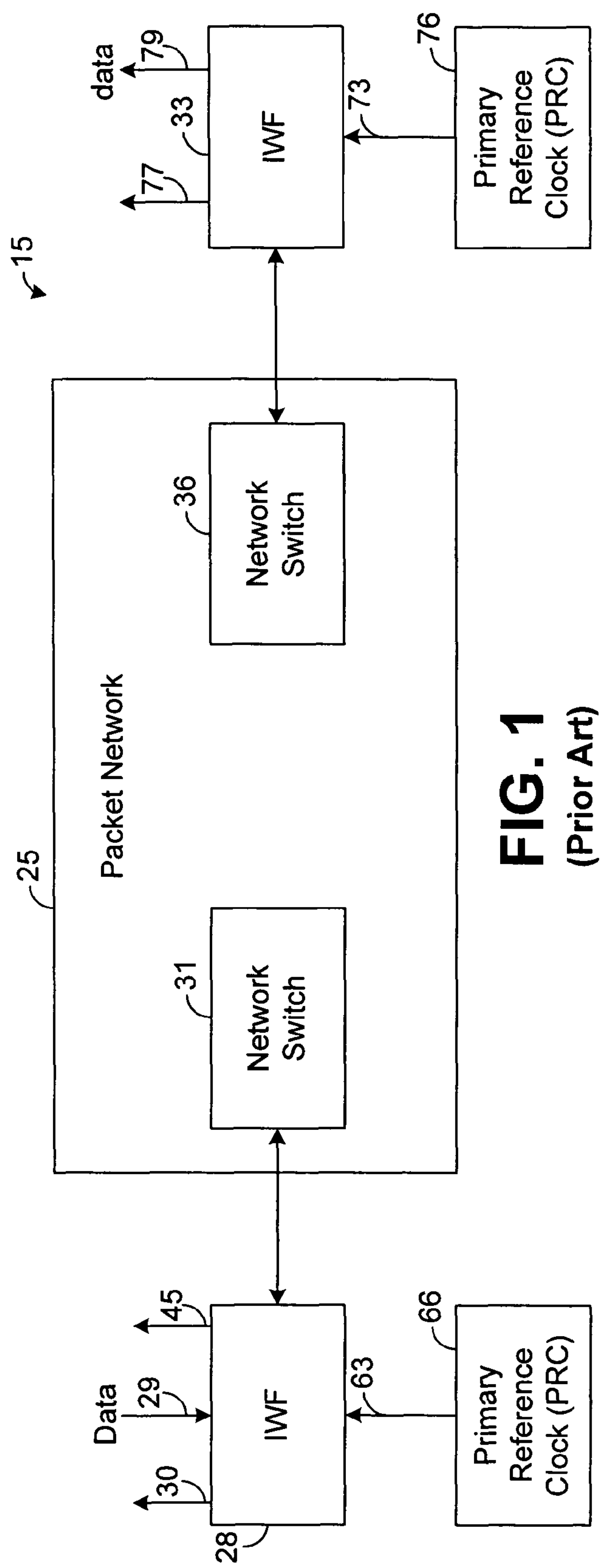
FIG. 1 is a block diagram illustrating a conventional communication system.

FIG. 1 depicts a conventional communication system 15 employing a packet network 25, such as an Internet Protocol (IP) network. An interworking function (IWF) 28, which is coupled to a network switch 31, receives a data signal 29, such as a T1 signal, that is to be communicated through the network 25 to an interworking function (IWF) 33, which is coupled to a network switch 36. The IWF 28 packetizes data from the signal 29 into a plurality of data packets compatible with the network 25, and each data packet includes a destination identifier that is used by the network 25 to route each such packet from the switch 31 to the switch 36. Note that each packet may pass through numerous switches, routers, and/or other network devices before being received at the switch 36, and different data packets may take the same or different paths to arrive at the switch 36.

Figure 2:
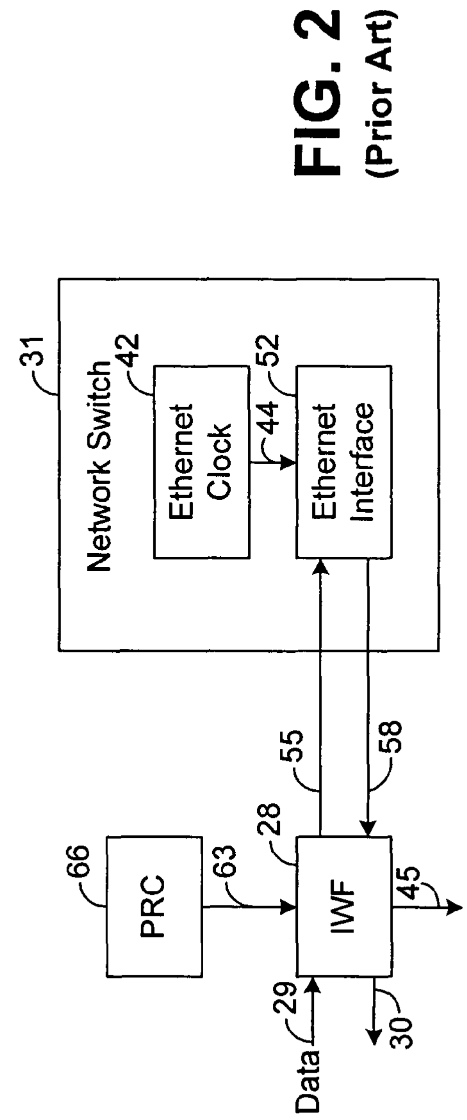
FIG. 2 is a block diagram illustrating a network switch depicted in FIG. 1.

The data signal 29 is communicated based on a clock signal, referred to as a "service clock signal." In one embodiment, the IWF 28 recovers the service clock signal from the data signal 29. Signal 30 in FIG. 2 represents the recovered service clock signal. In another embodiment, the IWF 28 generates the service clock signal 30, and the device (not shown) transmitting the data signal 29 to the IWF 28 recovers the signal 30 and uses the recovered signal to transmit the data signal 29.

As shown by FIG. 2, the network switch 31 comprises at least one Ethernet clock 42 that provides an Ethernet clock signal 44 to an Ethernet interface 52, which is implemented on a single integrated circuit (IC) chip. The IWF 28 transmits data packets to the Ethernet interface 52 via a data stream 55. The Ethernet interface 52 then transmits the data packets to other network components so that the packets can be routed to their appropriate destination.

In addition, the Ethernet interface 52 may receive, from other network components, data packets to be transmitted to the IWF 28. Using the clock signal 44, the Ethernet interface 52 transmits any such data packets to the IWF 28 via data stream 58. Note that each of the streams 55 and 58 is transmitted across one or more communication connections, such as a copper wire pair or a fiber optic cable.

The IWF 28 can recover the Ethernet clock signal 44 based on the timing of the data stream 58 received from the Ethernet interface 52 to provide an Ethernet clock signal 45 that is synchronized in frequency with signal 44. In this regard, signal 45 is traceable to signal 44. A first signal is generally traceable to a second signal when it is based on the second signal such that fluctuations in the frequency of the second signal correspondingly appear in the frequency of the first signal. For illustrative purposes, it will be assumed hereafter that signal 45 is traceable to signal 44. As an example, using known clock recovery techniques, the signal 45 may be generated by recovering the signal 44 from the data stream 58. The signal 45 may have a frequency matching that of signal 44, or the frequencies of the two signals 44 and 45 may be different.

The data streams 55 and 58 can be at the same rate or can be at different rates. In some examples, the IWF 28 transmits the data stream 55 using the Ethernet clock signal 45 that is generated by the IWF 28 based on the data stream 58. In other examples, it is possible for a local Ethernet clock (not shown) to provide the clock signal 45 to the IWF 28 and for the Ethernet interface 52 to generate the clock signal 44 based on the data stream 55 received from the IWF 28. Regardless of the timing signals used, synchronous data communication occurs between the IWF 28 and the network switch 31, and one of the signals 44 or 45 is traceable to the other signal.

The IWF 28 periodically transmits, to the destination IWF 33, timing information that allows the IWF 33 to generate a service clock signal 77 that is synchronous to the service clock signal 30. In this regard, the IWF 28 is coupled to and receives a primary reference clock (PRC) signal 63 from a primary reference clock 66. Periodically, the IWF 28 inserts a packet, referred to as a "timing packet," into the stream 55 of data packets being transmitted to the network switch 31. Such timing packets include timing information specifying timing relationships between the service clock signal 30 and the very reliable PRC signal 63. For example, the timing packets may indicate, relative to the PRC signal 63, when edges of the foregoing service clock signal 30 occur.

As shown by FIG. 1, the destination IWF 33 is also coupled to and receives a very precise PRC signal 73 from a primary reference clock 76. The configuration of the destination IWF 33 can be identical or similar to that of the source IWF 28. Based on the timing packets and the PRC signal 73, which should be synchronous to the PRC signal 63, the IWF 33 provides a service clock signal 77 that is synchronous to the service clock signal 30. Using the service clock signal 77 and data from the data packets transmitted by the source IWF 28, the destination IWF 33 provides a data signal 79 that is synchronous to the data signal 29 originally received by the source IWF 28. In this regard, the PRC signals 63 and 73 serve as a frame of reference for conveying information about the timing of the service clock signal 30 to the destination IWF 33 so that the destination IWF 33 can generate a service clock signal 77 that is synchronous to the original service clock signal 30.

Unfortunately, depending on the configuration of the system 15, one or both of the IWFs 28 and/or 33 may not have access to a PRC signal. In such cases, other techniques must be used to enable synchronization of the data signals 29 and 79.

In some cases, depending on the configuration of the network 25, the network switch 31 may have access to a PRC signal. In such a case, the network switch 31 may be configured to phase lock, to a PRC signal, the Ethernet clock signal 44 used for communication with the IWF 28. In such a situation, the Ethernet clock signal 44 and, therefore, the recovered Ethernet clock signal 45 are synchronous to a PRC signal, and this signal 45 may be used as a frame of reference for defining the timing information to be sent to the IWF 33. If the IWF 33 does not have access to a local PRC signal 73, then an Ethernet clock signal used by IWF 33 can be similarly phase locked with a PRC signal accessible to the switch 36. If such an Ethernet clock signal is phase locked to a PRC signal, then the Ethernet clock signal can serve as a frame of reference for using the timing information from the source IWF 28 to generate the service clock signal 77.

However, phase locking an Ethernet clock signal used by either of the IWFs 28 or 33 to a PRC signal has various drawbacks, including requiring specialized circuitry for enabling such phase locking. Further, modification to existing designs of network switches 31 or 36 may be required to enable such phase locking.

Figure 3:
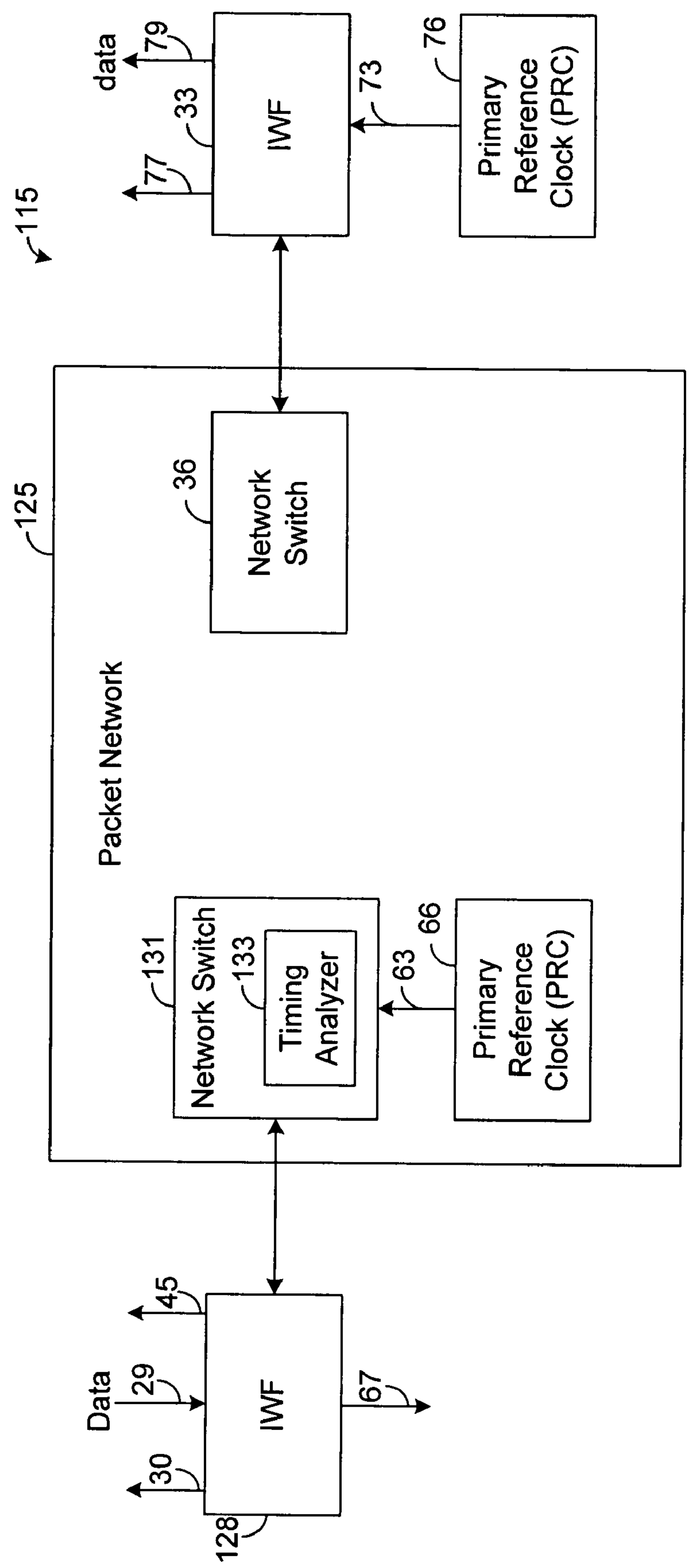
FIG. 3 is a block diagram illustrating an exemplary embodiment of a communication system in accordance with the present disclosure.

FIG. 3 depicts a communication system 115 in accordance with an exemplary embodiment of the present disclosure. The system 115 comprises a packet network 125, such as an IP network. The network 125 is coupled to and enables communication between two IWFs 128 and 33. The configuration of the network 125 is identical to that of the conventional network 25 except that a network switch 131 having a timing analyzer 133 is used in lieu of the conventional switch 31, and this switch 131 is coupled to a primary reference clock 66 of the network 125. In other embodiments, the timing analyzer 133 may be located external to the switch 131. For example, such as is described in more detail hereafter, the conventional switch 31 of FIG. 2 may be used in lieu of the switch 131 shown by FIG. 3. In such an embodiment, the Ethernet interface 52 may reside on an integrated circuit (IC) chip having input and output ports, and the timing analyzer 133 may be coupled to one or more of such ports. Other configurations are possible in yet other embodiments.

For purposes of illustration, the IWF 128 will, in general, be described as transmitting data to the IWF 33 and will, therefore, be referred to as the "source IWF 128." The IWF 33 will be referred to hereafter as the "destination IWF." However, it is to be understood that data may be communicated in the opposite direction such that the IWF 33 transmits data packets to the IWF 128.

In one exemplary embodiment, a clock signal, which is available to both the IWF 128 and the network switch 131, is used as a frame of reference for conveying information about the PRC signal 63 to the IWF 128 so that the IWF 128 can generate a PRC signal that is synchronous to the network PRC signal 63. For example, in one such embodiment, the timing analyzer 133 is configured to determine timing relationships between the PRC signal 63 and an Ethernet clock signal that is used to communicate data between the IWF 128 and the switch 131. Based on such timing relationships, the timing analyzer 133 provides timing information that is transmitted by the switch 131 to the IWF 128. The IWF 128 then generates a PRC signal. As an example, the IWF 128 may use the timing information and the Ethernet clock signal 45 to generate, at the IWF 128, a PRC signal 67 that is synchronous to the PRC signal 63. In one embodiment, the PRC signal 67 has the same frequency as the PRC signal 63. In other embodiments, the PRC signal 67 may have a different frequency relative to the PRC signal 63 but is nevertheless traceable to the PRC signal 63.

By having access to a PRC signal 67, the source IWF 128 can employ known techniques to enable the destination IWF 33 to generate a service clock signal 77 that is synchronized with the service clock signal 30. For example, in some embodiments, as described above for conventional IWF 28, the IWF 128 is configured to periodically insert timing packets into the stream of data packets being transmitted to the network switch 131. Such timing packets include timing information specifying timing relationships between the service clock signal 30 and the PRC signal 67 generated by the IWF 128. For example, a timing packet may indicate, relative to the PRC signal 67, when an edge of the service clock signal 30 occurs. Based on the timing packets from the source IWF 128 and the PRC signal 73, the destination IWF 33 is able to generate a service clock signal 77 that is synchronized with the service clock signal 30. The destination IWF 33 may then use this synchronized service clock signal 77 to communicate the data signal 79 so that this signal 79 is synchronized with the data signal 29 originally received by the source IWF 128.

Figure 4:
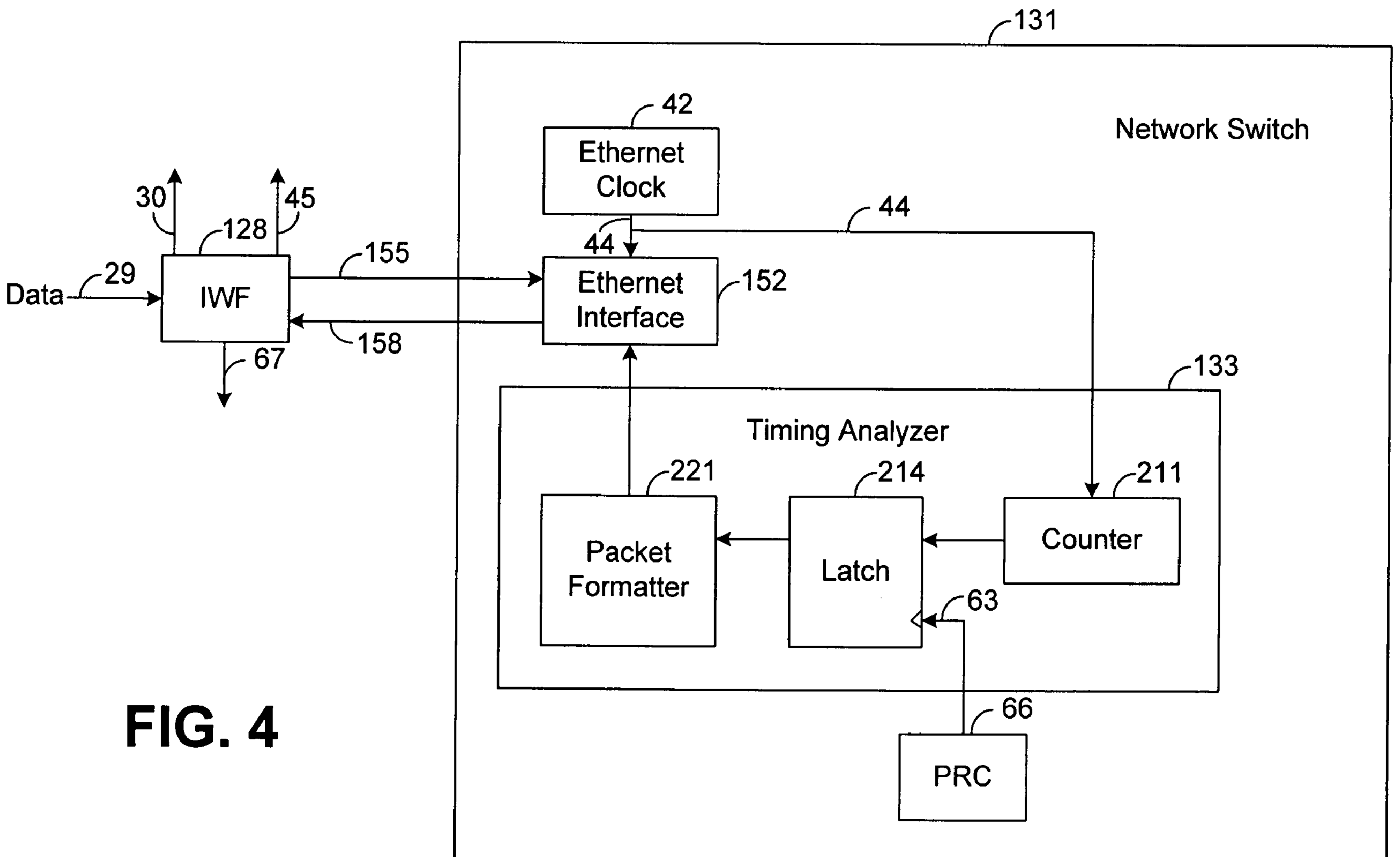
FIG. 4 is a block diagram illustrating an exemplary embodiment of a network switch, such as is depicted in FIG. 3.

There are various types of timing information that may be provided by the timing analyzer 133 to enable the IWF 128 to generate the PRC signal 67, and there are various possible configurations of the timing analyzer 133. FIG. 4 shows one exemplary embodiment of the timing analyzer 133, which will be described in more detail hereinbelow.

As shown by FIG. 4, the network switch 131 comprises an Ethernet interface 152 similar to the conventional Ethernet interface 52 of FIG. 2. The Ethernet interface 152 receives a stream 155 of data packets from the IWF 128 and transmits a stream 158 of data packets to the IWF 128. Similar to conventional Ethernet interface 52, the Ethernet interface 152 of FIG. 4 may be implemented on a single integrated circuit (IC) chip, although other configurations of the interface 152 are possible in other embodiments. Note that portions of the Ethernet interface 52, as well as the IWFs 128 and 33, are implemented in hardware. However, it is possible for portions of the Ethernet interface 52, the IWF 128, and/or the IWF 33, to be implemented in software, hardware, or a combination thereof. For any portion implemented in software, an instruction execution device (not shown), such as a microprocessor, may be used to execute the software.

As described above for conventional system 15, the IWF 128 may recover the Ethernet clock signal 44 based on the data stream 158 to provide, at the IWF 128, an Ethernet clock signal 45 synchronized with signal 44. Alternatively, the IWF 128 may receive the Ethernet clock signal 45 from a local Ethernet clock (not shown), and the Ethernet interface 152 may be configured to recover this Ethernet clock signal 45 based on the data stream 155 to provide signal 44. In any event, one of the clock signals 44 or 45 is traceable to the other. For illustrative purposes, it will be assumed hereafter that signal 45 is generated by recovering the Ethernet clock signal 44 from the data stream 158.

In one embodiment, the Ethernet interface 152 is configured to continuously transmit data slots to the IWF 128. In this regard, if the Ethernet interface 152 has data destined for IWF 128, the interface 152 transmits this data at the rate of the Ethernet clock signal 44 or some other rate based on the clock signal 44. However, if the Ethernet interface 152 has no data destined for the IWF 128, the Ethernet interface 152 continues to transmit dummy data to the IWF 128 thereby continuously providing the IWF 128 with timing information about the Ethernet clock signal 44 so that signal 45 can be continually generated from stream 158. Dummy data is discarded by the IWF 128.

In the embodiment shown by FIG. 4, the timing analyzer 133 comprises a counter 211 that receives the Ethernet clock signal 44. The counter 211 is configured to increment for each cycle of the clock signal 44, although other timing patterns are possible in other embodiments. For example, to increment each cycle of the clock signal 44, the counter 211 could be configured to increment on either the rising or falling edge of the clock signal 44. For illustrative purposes it will be assumed hereafter that the counter 211 increments on each rising edge of the clock signal 44.

The timing analyzer 133 also comprises a latch 214 that is clocked by the PRC signal 63. Once per cycle of the PRC signal 63, the latch 214 latches the value being received from the counter 211 thereby overwriting the previous value stored in the latch 214. For example, the latch 214 can be configured to latch the value from the counter 211 on either the rising or falling edge of the PRC signal 63. For illustrative purposes, it will be assumed hereafter that the latch 214 latches the value from counter 211 on the rising edge of the PRC signal 63 unless otherwise indicated. In other embodiments, other timing patterns for the latch 214 are possible. Note that the value stored in the latch 214 is output from the latch 214 to a packet formatter 221.

When the packet formatter 221 receives a new value from the latch 214, the packet formatter 221 stores the new value. The difference between successive latched values indicates the number of cycles of the Ethernet clock signal 44 that occurred in the previous period of the PRC signal 63, assuming that the latch 214 is latches once per period of the PRC signal 63. In other examples, the packet formatter 221 may be configured to store a new value from the latch 214 at an interval of any number of PRC signal periods.

It should be noted that the packet formatter 221 can be implemented in software, hardware, or a combination thereof. If implemented in software, the packet formatter 221 may comprise an instruction execution device, such as a microprocessor, for storing and executing instructions of the packet formatter 221.

Moreover, based on the output of the latch 214, the packet formatter 221 is configured to periodically define information indicative of the value in latch 214 and packetize this information into at least one packet, referred to as a "timing packet." In this regard, the timing information is indicative of the period of the PRC signal 63 over some known interval.

Based upon such timing packets and the Ethernet clock signal 45, which is traceable to the signal 44, the IWF 128 generates the PRC signal 67. In this regard, the Ethernet clock signal 45 serves as a frame of reference for using the timing information in the timing packets from the packet formatter 221 in order to control the timing of the PRC signal 67 being generated so that this signal 67 is synchronized to the PRC signal 63 of the network 125.

For example, in one exemplary embodiment, the IWF 128 generates PRC signal 67 with a period which has the same number of Ethernet clock signal periods as PRC signal 66. Based on the timing information, the IWF 128 adjusts the period of the PRC signal 67 such that it is synchronized with PRC signal 63. Moreover, the generated PRC signal 67, which is traceable to the PRC signal 63, can be used as a frame of reference for enabling the source IWF 128 to provide timing information about the service clock signal 30 to the destination IWF 33 according to known techniques.

An exemplary use and operation of the timing analyzer 133 will be described in more detail hereafter with particular reference to FIG. 5. For purposes of illustration, the actions of the timing analyzer 133 will be described hereafter as being triggered by rising edges of the signals 44 and 63. In other examples, it is possible for actions to be triggered by falling edges of the signals 44 and 63 and/or both rising and falling edges of the signals 44 and 63.

For purposes of illustration, assume that the Ethernet clock signal 44 has a frequency of 125 mega-Hertz (MHz) and that the PRC signal 63 has a frequency of 8 kilo-Hertz (kHz) such that ideally 15,625 cycles of the Ethernet clock signal 44 occur for every cycle of the PRC signal 63. In other examples, other frequencies for the Ethernet clock signal 44 and/or the PRC signal 63 are possible.

The IWF 128 generates a PRC signal 67 based on the Ethernet clock signal 44. In this regard, to generate the PRC signal 67, the IWF 128 uses known techniques to generate the Ethernet clock signal 45 by recovering the Ethernet clock signal 44 from the data stream 158 and then adjusts the timing of the signal 67 based on timing packets provided by the packet formatter 221, as will be described in more detail hereafter.

Figure 5:
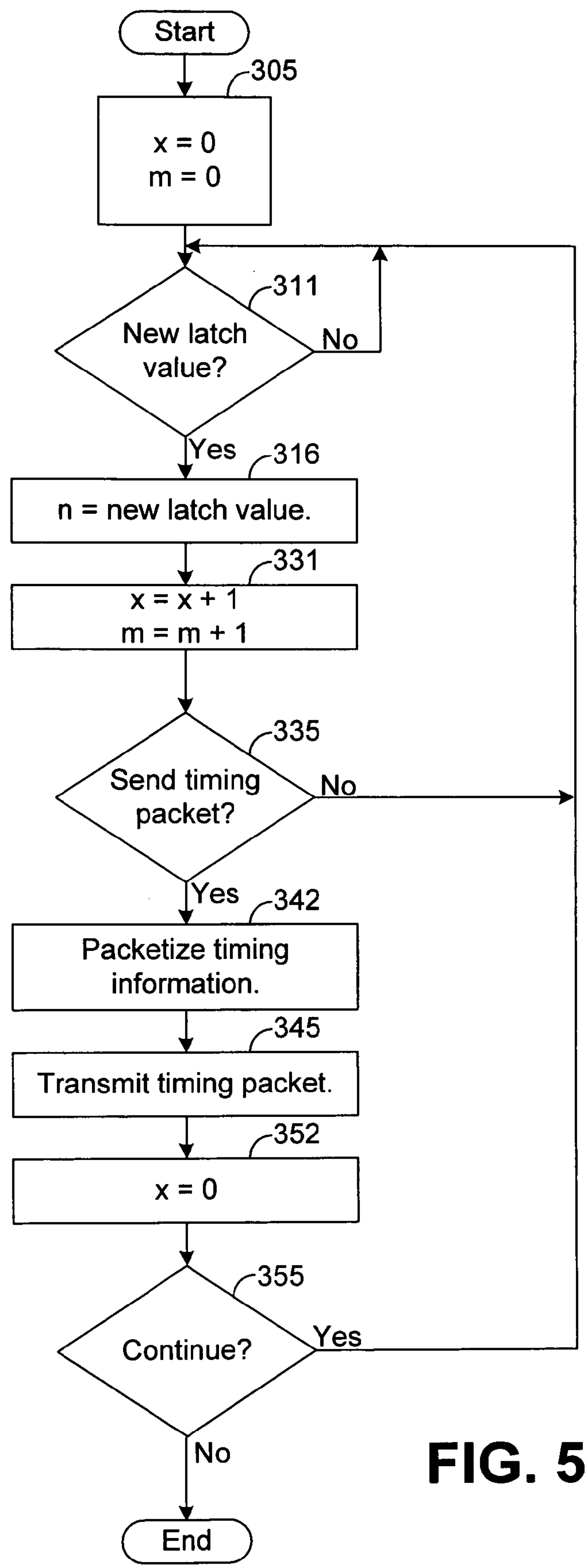
FIG. 5 is a flow chart illustrating an exemplary method for providing timing information in accordance with the present disclosure.

As shown by block 305 of FIG. 5, the packet formatter 221 initializes variable x to zero and m to zero. Assume that the value latched into latch 214 on the previous rising edge of the PRC signal 63 was $n_0$.

Moreover, the counter 211 continues to increment upon each rising edge of the Ethernet clock signal 44. For purposes of illustration, assume that only 15622 cycles of the Ethernet clock signal 44 actually occur during the current cycle of the PRC signal 63. Thus, upon the next rising edge of the PRC signal 63, the value in the counter 211 should be equal to $n_0$+15622. The latch 214 is configured to overwrite the value stored therein with the value from the counter 211 upon each rising edge of the PRC signal 63. Therefore, the latch 214 stores a value equal to $n_0$+15622.

The packet formatter 221 detects that a new value has been latched and, in response, makes a "yes" determination in block 311. In block 316, the packet formatter 221 assigns the new value to the variable n. In the current example, n is equal to $n_0$+15622.

As shown by block 331, the variables x and m are redefined for the next cycle of the PRC signal 63. In this regard, x and m are incremented.

In block 335, the packet formatter 221 determines whether a timing packet is to be sent to the IWF 28. The packet formatter 221 could be configured to control the transmission of timing packets according to any desired algorithm. For example, the packet formatter 221 could transmit a timing packet for each cycle of the PRC signal 63 such that a "yes" determination in block 335 is always made. In another example, the packet formatter 221 could transmit a timing packet after a predetermined amount of time has lapsed since transmission of the last timing packet or after a predefined number of cycles of the PRC signal 63 since transmission of the last timing packet.

For purposes of illustration, assume that the packet formatter 221 is configured to transmit a timing packet every two cycles of the PRC signal 63. In the instant example, the determination in block 335 could be based on the value of x. In this regard, if x is less than two, the packet formatter 221 makes a "no" determination in block 335. Otherwise, the packet formatter 221 makes a "yes" determination in block 335. In the instant example, the value of x is equal to one. Therefore, the packet formatter 221 returns to block 311 and repeats the aforedescribed process from this point.

Assume that during the next cycle of the PRC signal 63, 15620 cycles of the Ethernet clock signal 44 occur. In such an example, the next value latched by the latch 214 is $n_0$+31242 (i.e., $n_0$+15622+15620). Further, the value of x is incremented to a value of two and m is incremented to a value of two in block 331. Accordingly, the packet formatter 221 makes a "yes" determination in block 335 now that two cycles of the PRC signal 63 have occurred.

As shown by block 342, the packet formatter 221 packetizes timing information to form a timing packet to be transmitted to the IWF 128. In some embodiments, the timing information comprises n and m. The difference between successive values of n represents the total number of periods of the Ethernet clock signal 44 occurring over the last two cycles of the PRC signal 63. The difference between successive values of m represents the number of PRC periods which have occurred since the previous value of n. Thus, the values of m and n in two successive timing packets can be analyzed to determine a timing relationship between the Ethernet clock signal 44 and the PRC signal 63. As an example, assume that a first timing packet has a value $m_1$ and $n_1$ and that the next timing packet has a value of $m_2$ and $n_2$. In such an example, it can be determined, based on the two timing packets, that $n_2$-$n_1$ periods of the Ethernet clock signal 44 occurred during $m_2$-$m_1$ periods of the PRC signal 63. In other embodiments, the timing information can comprise other types of information. However, the timing information preferably indicates some kind of timing relationship between the Ethernet clock signal 44 and the PRC signal 63 so that the IWF 128 can appropriately adjust the timing of the PRC signal 67 to keep this signal 67 synchronized in frequency with the PRC signal 63.

As shown by block 345, the packet formatter 221 transmits the timing packet formed via block 342 to the Ethernet interface 152, which inserts the timing packet into the data stream 158. The IWF 128 then extracts the timing information from the timing packet and uses this information to appropriately adjust the PRC signal 67. In the instant example, the timing information indicates that 31242 cycles of the Ethernet clock signal 42 occurred in the last two cycles of the PRC signal 63. Thus, the IWF 128 controls the PRC signal 67 such that exactly two cycles of the signal 67 occur during the next 31242 cycles of the Ethernet clock signal 45.

After transmitting the timing packet in block 345, the packet formatter 221 reinitializes the variable x for the next cycle of the PRC signal 63, as shown by block 352 of FIG. 5. In block 355, the packet formatter 221 determines whether monitoring of the clock signals 44 and 63 is to continue. If so, the packet formatter 221 returns to block 311. If not, the process shown by FIG. 5 ends. The determination in block 355 can be based on any desired factor, such as whether communication between the IWF 128 and the Ethernet interface 152 is to continue, assuming that signals 44 and 45 have the same frequency.

In some embodiments, the counter 211 is a free running counter in that it continues to increment until its maximum value is reached. Once the maximum value is reached, the counter 133 resets to a value of 0 on the next increment and then continues to increment from there. Therefore, if the difference between two successive values of n is negative, this difference is preferably increased by the maximum value of the counter 211 plus one to determine the correct number of Ethernet periods.

FIG. 3 shows the destination IWF 33 as having direct access to a PRC signal 73. If such a signal 73 is not available, the IWF 33 may generate a PRC signal from a PRC source within the network 125 similar to the way that the source IWF 128 is described above as generating the PRC signal 67 from PRC 66 in FIG. 3. In fact, it is possible to pass a PRC signal through the network 125 by regenerating the PRC signal at various points according to the techniques described herein. Thus, a PRC source does not need to be located close to a particular component for the component to gain access to the source's PRC signal.

Figure 6:
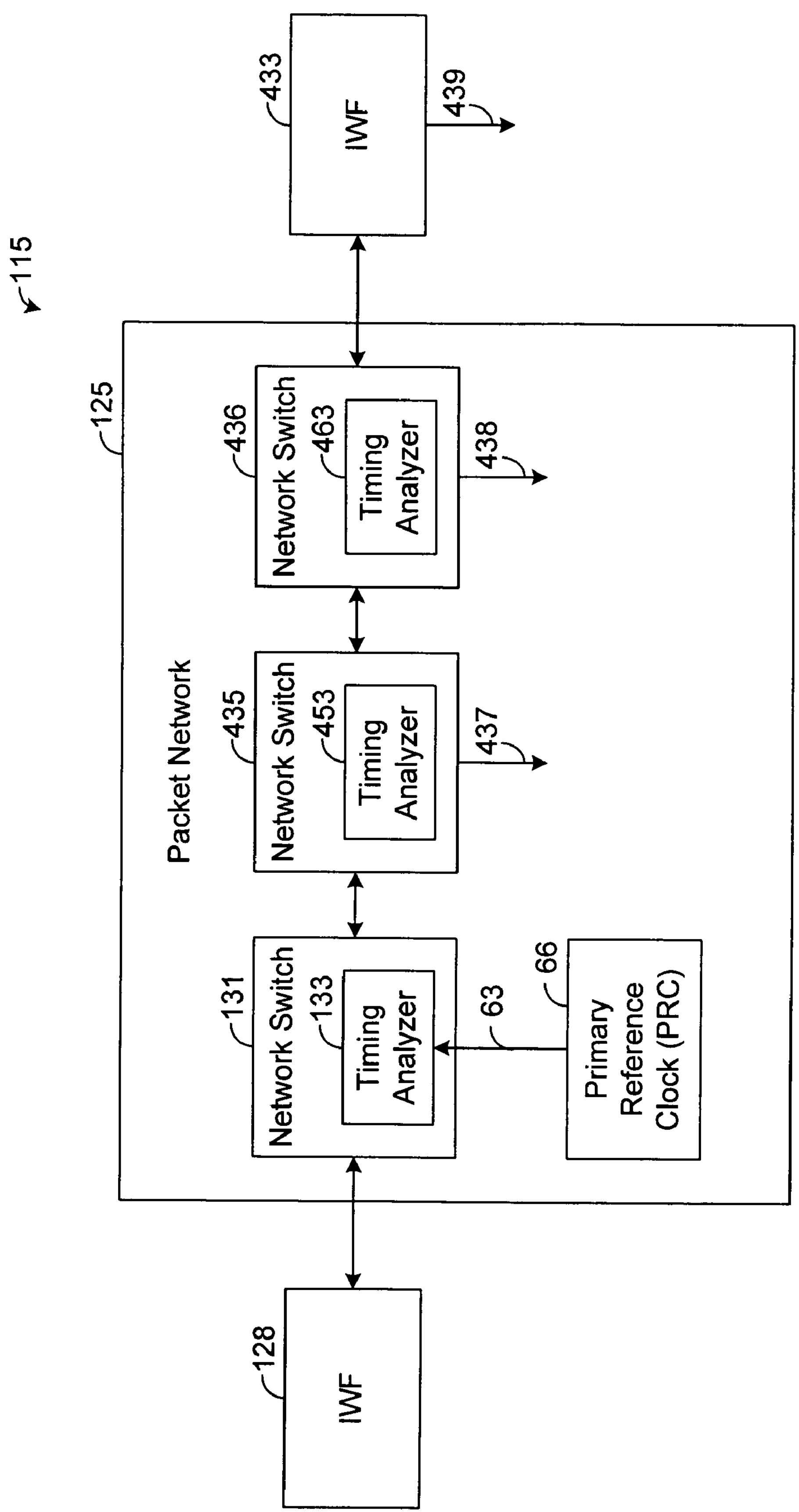
FIG. 6 is a block diagram illustrating an exemplary embodiment of a communication system in accordance with the present disclosure.

For example, FIG. 6 shows an embodiment that is similar to the embodiment depicted by FIG. 3 except that a destination IWF 433 does not have a local primary reference clock 76 from which it can access the PRC signal 73. Note that, for simplicity, FIG. 6 shows three network switches 131, 435 and 436 extending along a data path from the source IWF 128 to the destination IWF 433. In other embodiments, there may be many more components (e.g., switches, routers, etc.) between the IWFs 128 and 433.

In the embodiment shown by FIG. 6, the network switch 435 may be configured to generate a PRC signal 437 according to the techniques described above for generating the PRC signal 67 at the IWF 128. In this regard, the network switch 435 may be configured to recover the Ethernet clock signal 44 used by the switch 131 for data communication, and the same timing packets described above as being transmitted to the IWF 128 maybe transmitted by the network switch 131 to the network switch 435. The network switch 435 may then generate, based on the recovered Ethernet clock signal and the timing packets, a PRC signal 437 that is traceable to the PRC signal 63, similar to the techniques employed by the IWF 128.

The network switch 435 may comprise a timing analyzer 453 similar to the timing analyzer 133 described above. Using the PRC signal 437 and a local Ethernet clock signal used for data communication between the switches 435 and 436, the timing analyzer 453 may generate timing packets indicating timing relationships between the local Ethernet clock signal and the PRC signal 437. These timing packets may then be used by the network switch 436 to generate, according to the techniques described above, a PRC signal 438 that is traceable to the PRC signal 437 and, therefore, the PRC signal 63.

Similarly, the network switch 436 may comprise a timing analyzer 463 similar to the timing analyzers 133 and 453 described above. Using the PRC signal 438 generated by the switch 436 and a local Ethernet clock signal used for data communication between the switch 436 and the IWF 433, the timing analyzer 463 may generate timing packets indicating timing relationships between the local Ethernet clock signal and the PRC signal 438. These timing packets may then be used by the IWF 433 to generate, according to the techniques described above, a PRC signal 439 that is traceable to the PRC signal 438 and, therefore, the PRC signals 63 and 437. Thus, the IWF 433 may have access to a PRC signal 439 even though a PRC source is not in close proximity to the IWF 433. Similar techniques may be used to pass a PRC signal over significant distances to the IWF 128 or other system components.

Figure 7:
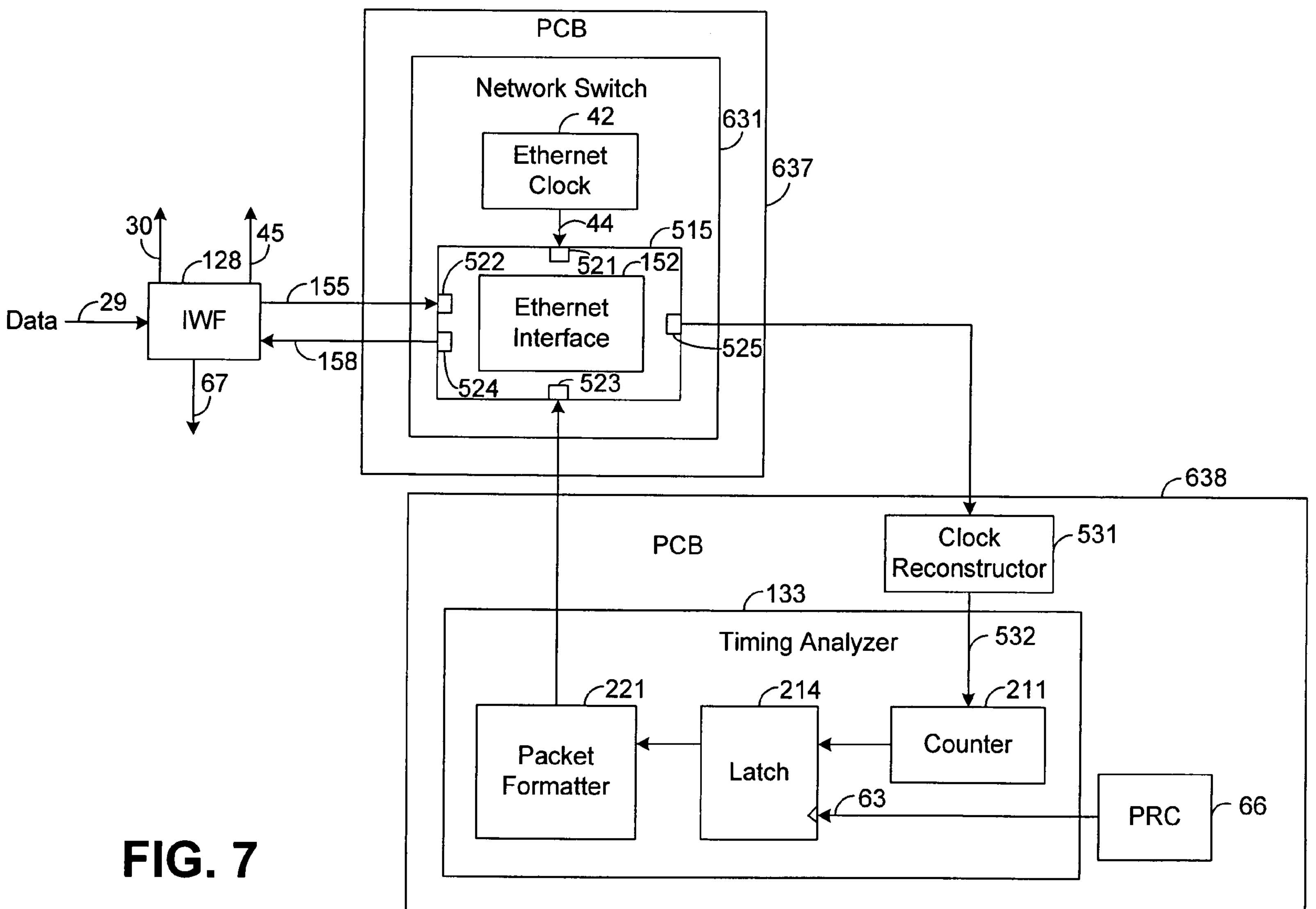
FIG. 7 is a block diagram illustrating an exemplary embodiment of a network switch and a timing analyzer in accordance with the present disclosure.

In some embodiments, the Ethernet interface 152 (FIG. 4) has at least one other port, in addition to the data port used to transmit data to the IWF 128, that runs off of the Ethernet clock signal 44. For example, FIG. 7 shows an embodiment having a network switch 631 that is similar to the switch 131 depicted by FIG. 4. The switch 631 has an Ethernet interface 152 that is implemented on an IC chip 515. The IC chip 515 has an input port 521 for receiving the Ethernet clock signal 44. The IC chip 515 also has an input port 522 for receiving the data stream 155 from the IWF 128 and an input port 523 for receiving timing packets from the packet formatter 221. The IC chip 515 further has at least two output ports 524 and 525 for transmitting data based on the Ethernet clock signal 44. In this regard, the output port 524 is used to transmit the data stream 158 to the IWF 128 based on the Ethernet clock signal 44, and the output port 525 is used to transmit data to a clock reconstructor 531. Note that the IC chip 515 may comprise other ports, such as ports for communicating with other switches in the network 125.

In the exemplary embodiment depicted in FIG. 7, the network switch 631 resides on a printed circuit board (PCB) 637, and the timing analyzer 133, as well as possibly other components, such as the clock reconstructor 531 and PRC 66, reside on a PCB 638. In such an example, one or more cables (not specifically shown) may extend between the PCBs 637 and 638 to enable communication between the components of such PCBs 637 and 638. In other embodiments, other configurations are possible. For example, the timing analyzer 133 may reside on the same PCB 637 as the network switch 631, or the components of the network switch 631 and/or the timing analyzer 133 may be mounted on additional PCBs (not shown).

Based on the data transmitted from port 525, the clock reconstructor 531 recovers the Ethernet clock signal 44, according to known techniques, to provide a clock signal 532 synchronized in frequency with the signal 44. In this regard, the timing of the data transmitted to the reconstructor 531 is based on and synchronous to the Ethernet clock signal 44 making it possible for the reconstructor 531 to recover this clock signal 44. In this way, the clock signal 532 is synchronous to the Ethernet clock signal 45 recovered from the data stream 158. The clock reconstructor 531 provides the clock signal 532 to the counter 211, which is used to count the number of cycles of the Ethernet clock signal 532 in each cycle of the PRC signal 63.

Note that any data, including dummy data, may be transmitted via port 525, but it is generally desirable for the data transmission to be continuous so that the timing analyzer 133 can continually monitor the Ethernet clock signal 532 relative to the PRC signal 63.

In the embodiment depicted by FIG. 7, the timing packets provided by the packet formatter 221 are transmitted to the Ethernet interface 152 and the header indicates that the destination is the IWF 128. In this way, PRC timing may be passed through a timing-unaware network switch 631 to an IWF 128, where the PRC signal 67 can then be generated based on these timing packets and the Ethernet clock signal 45.

Many conventional network switches have multiple ports which are synchronous to each other similar to the one shown in FIG. 7. Such conventional network switches could be used to receive timing packets from the packet formatter 221 and to forward the timing packets to an IWF or other component, as described above, without any structural modification to the switch. Thus, readily available switches, including switches already implemented in current packet networks, could be used to implement the switch 631 shown by FIG. 7.

Figure 8:
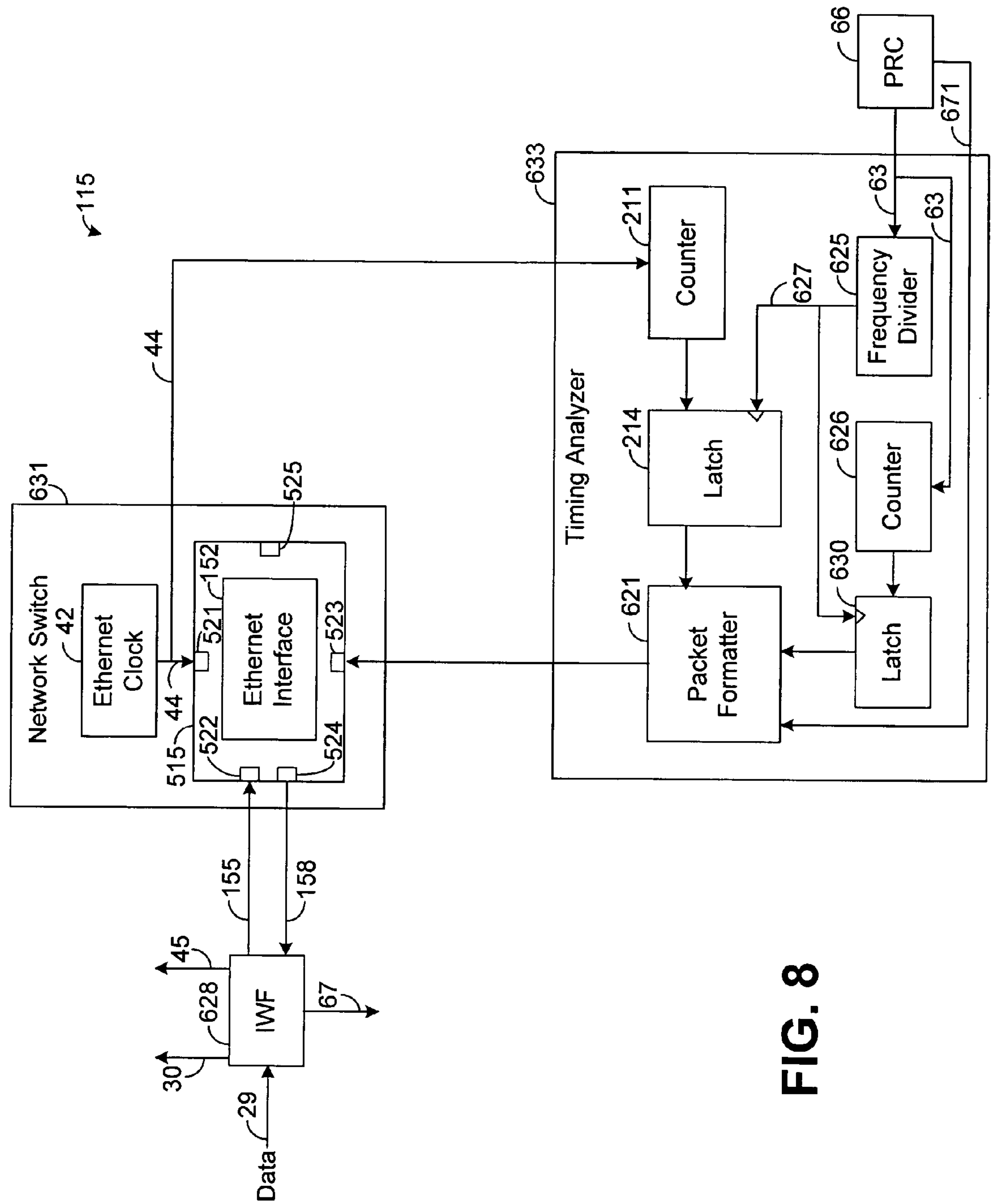
FIG. 8 is a block diagram illustrating an exemplary embodiment of a network switch and a timing analyzer in accordance with the present disclosure.

It should be noted that the embodiments described herein are exemplary, and various modifications to the afore-described embodiments are possible. FIG. 8 depicts another exemplary embodiment of a communication system 115 having an IWF 628 that generates a PRC signal 67 and utilizes the PRC signal 67 as a frame of reference for providing timing information about the service clock signal 30 to a remote IWF 33.

In the embodiment depicted by FIG. 8, a network switch 631, similar to the one depicted by FIG. 7, comprises an Ethernet clock 42 that provides an Ethernet clock signal 44 to interface 152 and counter 211. In other embodiments, the signal input to the counter 211 may be generated by recovering the Ethernet clock signal 44 from a data signal as described above for FIG. 7. As in the previously described embodiments, the counter 211 counts the cycles of the Ethernet clock signal 44, and a latch 214 latches such cycle count from the counter 211. Thus, a packet formatter 621 is periodically provided with the count value maintained by the counter 211.

In the embodiment depicted by FIG. 8, the PRC signal 63 is received by a frequency divider 625 that divides the frequency of the PRC signal 63 by some desired value, N, to provide a control signal 627 having a frequency equal to 1/N of the frequency of the PRC signal 63. N is selected such that a desired sampling frequency of the counter 211 is obtained. For example, if it is desired for a timing packet to be provided for each cycle of the PRC signal 63, as described above for some embodiments, then N can be equal to one. In such an example, the difference between consecutively latched values ($L_n$) and ($L_{n-1}$) from latch 214 generally represents the number of Ethernet clock cycles occurring during the last cycle of the PRC signal 63. In another example, assume that it is desired for a timing packet to be generated for every two cycles of the PRC signal 63, as described above for at least one embodiment. In such an example, the frequency divider 625 may divide the frequency of the signal 63 by two such that a rising edge is output by the frequency divider 625 for every two cycles of the PRC signal 63. Thus, the difference between consecutively latched values ($L_n$) and ($L_{n-1}$) from latch 214 generally represents the number of Ethernet clock cycles occurring during the last two cycles of the PRC signal 63. In other examples, the frequency divider 625 can divide the frequency of the PRC signal 63 by other amounts.

As shown by FIG. 8, a counter 626 is used to count periods of the PRC signal 63. This count value (C) is latched by a latch 630 based on the control signal 627 so that latches 214 and 630 are latched in unison. The count value (C) output by the latch 630 is received by the packet formatter 621. Moreover, each time the latch 214 latches a new value, the packet formatter 621 defines a timing packet and includes the current value of latch 214 and the current value (C) of latch 630 in the timing packet. The packet formatter 621 then transmits the timing packet to the Ethernet interface 152, which transmits the timing packet to the IWF 628. The IWF 628 then uses the timing packet to adjust the period of the PRC signal 67.

In this regard, assume that latch 214 is clocked every two cycles of the PRC signal 63. In such an example, the difference between the current value ($L_n$) in the latch 214 and the previous value ($L_{n-1}$) from the latch 214 generally represents the number of cycles of the Ethernet clock signal 44 occurring during two cycles of the PRC signal 63. Further, the difference between the current value ($C_n$) in the latch 630 and the previous value ($C_{n-1}$) from the latch 630 generally represents the number of cycles of the PRC signal 63 occurring during $L_n$-$L_{n-1}$ cycles of the Ethernet clock signal 44. In such an example, when the IWF 628 receives a new timing packet from the timing analyzer 633, the IWF 628 can generally subtract the count ($L_n$) from latch 214 of this timing packet to the count ($L_{n-1}$) from latch 214 of the previous timing packet to determine the number of Ethernet clock cycles that occurred in the last two cycles of the PRC signal 63, assuming that $C_n-C_{n-1}$ is equal to two. The IWF 628 may then use the calculated number to adjust the period of the PRC signal 67. For example, if $L_n-L_{n-1}$ of the two successive timing packets is 31242, then the IWF 628 may be configured to control the PRC signal 67 such that exactly two cycles of the PRC signal 67 occur over the next 31242 cycles of the Ethernet clock signal 45.

Note that if the latch value ($L_n$) of the last packet is less than the latch value ($L_{n-1}$) of the penultimate packet, then the counter 211 likely reset between the last two timing packets. In such a situation, the IWF 628 may account for the resetting of the counter 211 by adding the maximum counter value of counter 211 plus one to the difference $L_n-L_{n-1}$. Further, if the value ($C_n$) of the last packet is less than the value ($C_{n-1}$) of the penultimate packet, then the counter 626 likely reset between the last two timing packets. In such a situation, the IWF 628 may account for the resetting of the counter 626 by adding the maximum counter value of counter 626 plus one to the difference $C_n-C_{n-1}$.

Figure 9:
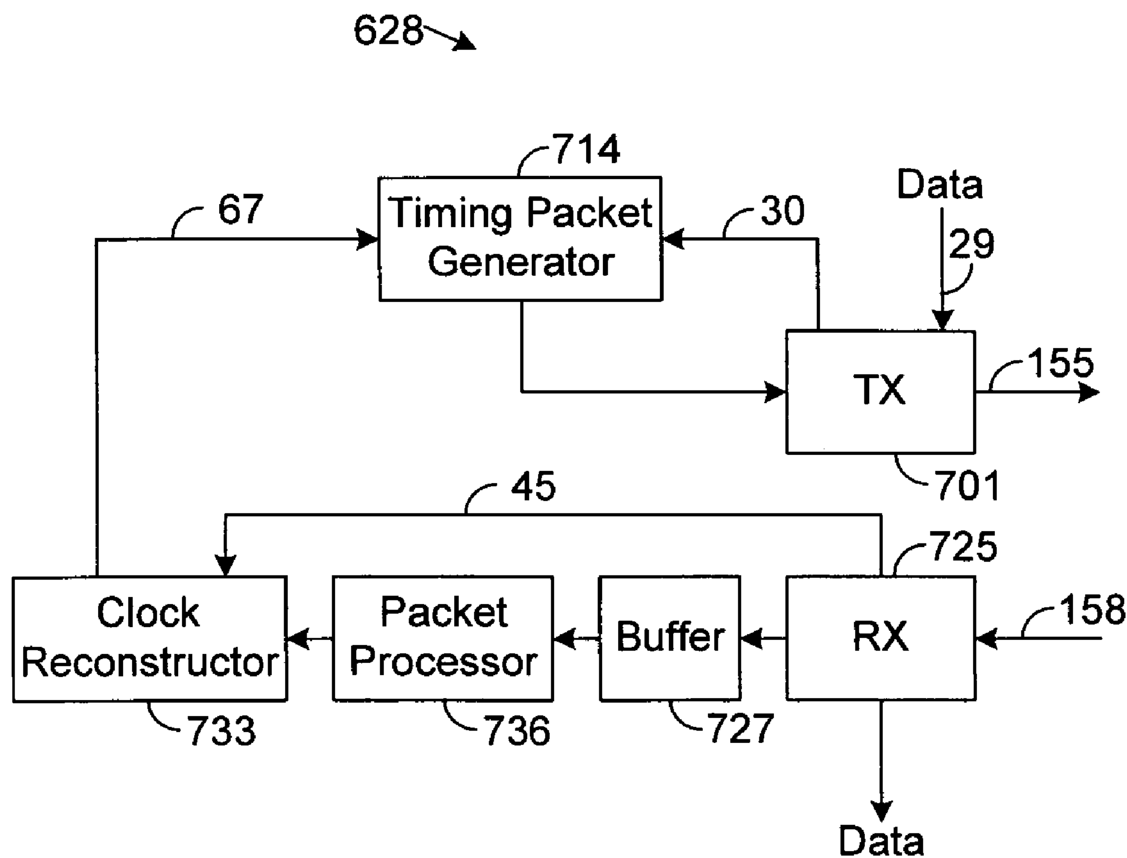
FIG. 9 is a block diagram illustrating an exemplary embodiment of an interworking function, such as is depicted in FIG. 8.

FIG. 9 depicts an IWF 628 in accordance with an exemplary embodiment of the present disclosure. The IWF 628 comprises a transmitter 701 that transmits the data stream 155 to the network switch 631 (FIG. 8). The transmitter 701 generates the service clock signal 30 based on the data signal 29 and transmits the recovered service clock signal 30 to a timing packet generator 714. The timing packet generator 714 compares the service clock signal 30 to the PRC signal 67 and uses known techniques to generate timing packets indicating timing relationships between the clock signals 67 and 30. The transmitter 701 inserts these timing packets into the data stream 155, and the destination IWF uses the timing packets to remain synchronized to the service clock signal 30.

As shown by FIG. 9, the IWF 628 also comprises a receiver 725 for receiving the data stream 158. Based on this data stream 158, the receiver 725 generates the Ethernet clock signal 45, which is synchronized with the Ethernet clock signal 44 used by the switch 631 for transmitting the data stream 158. A clock reconstructor 733 generates the PRC signal 67 by adjusting the frequency of the Ethernet clock signal 45 based on the timing packets. In this regard, as the receiver 725 receives timing packets from the data stream 158, the receiver 725 generally stores such timing packets in a buffer 727 except as will be described in more detail hereafter. A packet processor 736 extracts the values, $L_n$ and $C_n$, from each stored timing packet. For each such packet, the packet processor 736 subtracts the extracted values from corresponding values in another packet. Based on these differences, the clock reconstructor 733 adjusts the timing of the PRC signal 67 such that it precisely matches the timing of the PRC signal 63 (FIG. 8).

For example, in the instant embodiment, the difference ($D_1$) between the latched value ($L_n$) of a timing packet and the latched value ($L_{n-1}$) of the preceding timing packet generally represents the total number of cycles of Ethernet clock signal 44 occurring within the a number of cycles of the PRC signal 63 equal to the difference ($D_2$) between $C_n$ and $C_{n-1}$. Thus, upon receiving $D_1$ and $D_2$ from the packet processor 736, the clock reconstructor 733 is configured to control the period of the PRC signal 67 such that $D_2$ cycles of this signal 67 occur during the next $D_1$ cycles of the Ethernet clock signal 45.

Figure 10:
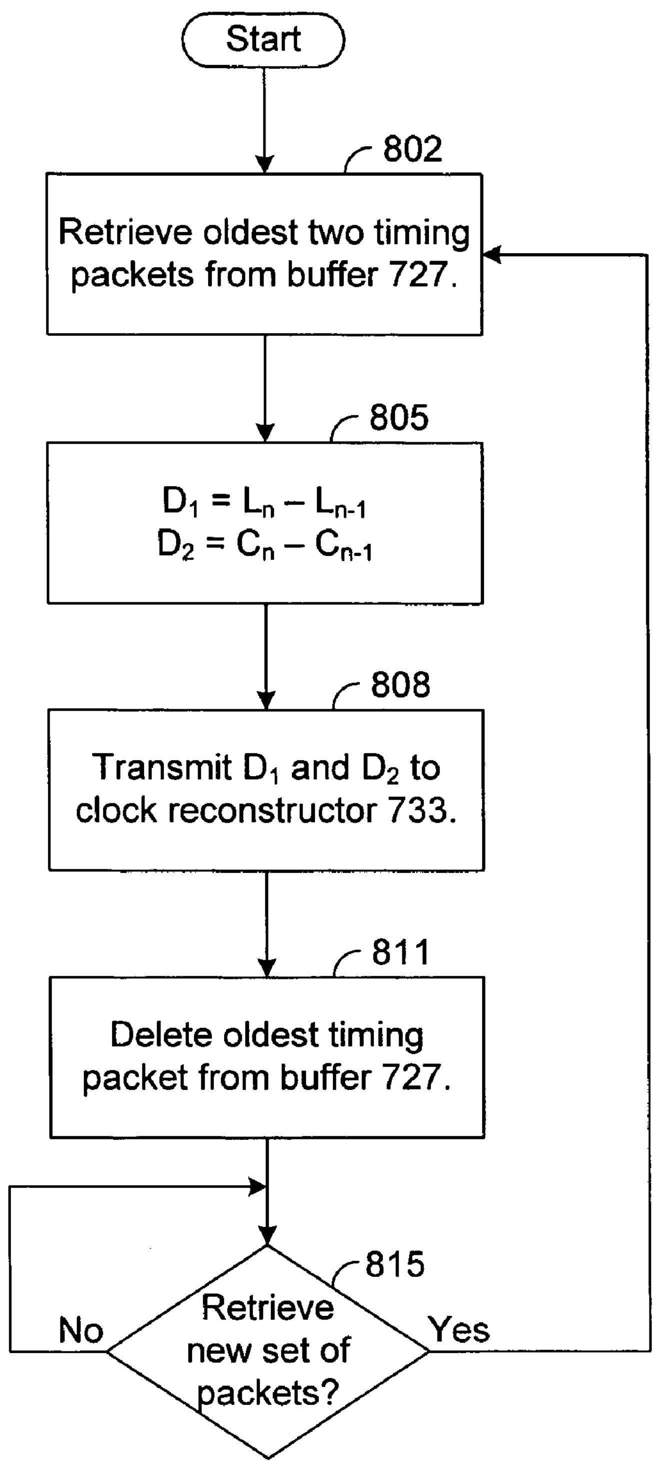
FIG. 10 is a flow chart illustrating an exemplary method for processing timing packets in accordance with the present disclosure.

FIG. 10 depicts an exemplary process that can be implemented by the packet processor 736 for processing timing packets. In this regard, each timing packet indicates its age relative to the other timing packets. For example, the packet formatter 621 of FIG. 8 may be configured to insert, into each timing packet, a sequence indicator that indicates the packet's sequence of transmission relative to the other timing packets. For example, the packet formatter 621 may increment the sequence indicator for each new timing packet such that the difference between successively transmitted timing packets is equal to one. Moreover, the sequence indicators of any two timing packets may be analyzed to determine which of the two timing packets was transmitted first. In another example, the sequence indicator may indicate the time that the respective packet is transmitted from the timing analyzer 633. In yet another example, the value $C_n$ from the counter 626 may be used as a sequence indicator. In this regard, older packets generally have higher count values $C_n$, provided that resetting of the counter 626 is accounted for. Various other types of data may be used for the sequence indicator Note that it is possible for some packets to be delayed during transmission or never reach the receiver 725. Thus, the packets may be received "out of order" or, in other words, received in a different order than transmitted. Moreover, upon receiving a timing packet, the receiver 725 is configured to determine whether the received timing packet is older than all of the other timing packets currently stored in the buffer 727. In this regard, a timing packet is "older" within a transmission sequence if it is transmitted before the other timing packet. In the instant example, a timing packet in the buffer 727 is considered to be older than another timing packet if it was transmitted by the timing analyzer 633 (FIG. 8) before the other timing packet. The receiver 725 may determine whether the received timing packet is older than all of the other timing packets currently stored in the buffer 727 by comparing sequence indicators. For example, in an embodiment in which the sequence indicator of each successively transmitted timing packet is incremented, the receiver 725 may determine whether the received timing packet is older than another timing packet by determining whether the sequence indicator of the received timing packet is greater than the sequence indicator of the other timing packet.

If the received timing packet is older than the oldest timing packet in the buffer 727, the receiver 725 discards the received timing packet without storing it to the buffer 727. Otherwise, the receiver 725 stores the received timing packet to the buffer 727.

As shown by block 802 of FIG. 10, the packet processor 736 retrieves the two oldest timing packets from buffer 727. Determining which of the stored timing packets are the two oldest can be based on the sequence indicators of the timing packets. For illustrative purposes, the value from latch 214 (FIG. 8) of the oldest timing packet will be referred to as $L_{n-1}$ and the value from latch 214 of the next-to-oldest timing packet will be referred to as $L_n$. Further, the value from latch 630 (FIG. 8) of the oldest timing packet will be referred to as $C_{n-1}$, and the value from latch 630 of the next-to-oldest timing packet will be referred to as $C_n$.

As shown by block 805, the packet processor 736 mathematically combines the values of the retrieved timing packets to provide the clock reconstructor 733 with information about a timing relationship between the PRC signal 63 (FIG. 8) and the Ethernet clock signal 45. In this regard, the packet processor 736 determines $D_1$ by subtracting $L_{n-1}$ from $L_n$, and the packet processor 736 determines $D_2$ by subtracting $C_{n-1}$ from $C_n$. The packet processor 736 transmits $D_1$ and $D_2$ to the clock reconstructor 733, as shown by block 808 of FIG. 10. The clock reconstructor 733 then adjusts the timing of the Ethernet clock signal 45, which is synchronous to the Ethernet clock signal 44, based on $D_1$ and $D_2$ to provide a PRC signal 67 traceable to the PRC signal 63. In this regard, the clock reconstructor 733 ensures that exactly $D_2$ cycles of the PRC signal 67 occur during $D_1$ cycles of the Ethernet clock signal 45. At the end of the $D_2$ cycles of the PRC signal 67, the clock reconstructor 733 controls the timing of the PRC signal 67 according to the next set of timing packets retrieved via the next occurrence of block 802 of FIG. 10. The clock reconstructor 733 continuously controls the timing of the PRC signal 67 in such a manner based on the timing packets retrieved from the buffer 727 thereby ensuring that the PRC signal 67 remains synchronous to the network PRC signal 63.

As shown by block 811 of FIG. 10, the packet processor 736, after retrieving the oldest two timing packets in block 802, deletes the oldest timing packet from the buffer 727. Thus, if a timing packet that is older than either of the retrieved packets is received by the receiver 725, it is discarded without being stored to the buffer 727. In this regard, as described above, a received timing packet is stored to the buffer 727 only if it is not older than the oldest packet stored in the buffer 727. Accordingly, the packets retrieved from the buffer 727 are retrieved in the same sequence of transmission although some packets may be missing (e.g., never arrive at the receiver 725 or discarded by the receiver 725). Indeed, discarding of older packets by the receiver 725 ensures that, once a set of packets have been retrieved from the buffer 727 in block 802, packets older than the retrieved set are not processed by the packet processor 736 thereby preventing out of order processing by the processor 736.

As shown by block 815, the packet processor 736 determines when to retrieve the next set of timing packets from the buffer 727. This determination may be based on any of several factors. For example, the packet processor 736 may wait until close to the end of the $D_2$ cycles of the PRC signal 67 that are based on the last set of packets retrieved via block 802. By waiting, additional timing packets may be received and stored to the buffer 727 possibly preventing at least some packets from being discarded by the receiver 725. Alternatively, before making a "yes" determination in block 815, the packet processor 736 may wait for an indication from the clock reconstructor 733 indicating that it is ready to receive more timing information. In other embodiments, other techniques for determining when to retrieve the next set of timing packets from the buffer 727 may be used.

Referring to FIG. 8, it may be desirable to notify the packet formatter 621 when the PRC signal 63 being received is unreliable. In this regard, the packet formatter 621 of FIG. 8 receives a PRC status signal 671 from the primary reference clock 66 indicating the status of the PRC signal 63. If the signal 671 indicates that the PRC signal 63 is unreliable, then the packet formatter 621 may take some corrective action. For example, the packet formatter 621, via one or more timing packets, may communicate the status of the PRC signal 63 to the IWF 628. During the time that PRC signal 63 is unreliable, the IWF 628 may be configured to refrain from updating the frequency of the PRC signal 67 (e.g., hold the frequency of the this signal 67 constant). Various other corrective action is possible in other embodiments.

Note that there are various reasons that might cause a PRC signal to become unreliable. For example, if the PRC signal is based on GPS signals, it is possible for the PRC 66 to temporarily stop receiving GPS signals. The PRC 66 may be configured to detect when communication of GPS signals is lost and indicate that the PRC signal 63 is unreliable during such time periods. In other examples, the PRC 66 may determine that the PRC signal 63 is unreliable based on other factors.

In various embodiments described herein, a timing analyzer determines timing relationships between an Ethernet clock signal and a first PRC signal. The timing analyzer then provides timing information indicative of timing relationships between an Ethernet clock signal and a first PRC signal. A first IWF uses the timing information to generate a second PRC signal traceable to the first PRC signal. The second PRC signal may then be used as a frame of reference for communicating timing information about other clock signals through the network. Thus, a service clock signal at one IWF may be synchronized with a service clock signal at another IWF even if the one IWF does not have access to a local PRC and without phase locking, to a PRC signal, the clock signals used to communicate between the one IWF and the packet network.

The network switches and IWF have generally been described above as communicating via Ethernet protocol. However, it is possible of the network switched and the IWFs to communicate via other types of protocols in other embodiments.

Now, therefore, the following is claimed:

1. A communication system, comprising:

a first interworking function; and a packet network having an interface coupled to the first interworking function and configured to transmit a data signal transporting a stream of data packets to the first interworking function, the packet network having a timing analyzer configured to receive a first clock signal and a first primary reference clock (PRC) signal, the data signal synchronous to the first clock signal, the timing analyzer further configured to transmit timing information indicative of a timing relationship between the first clock signal and the first PRC signal, wherein the first interworking function is configured to receive the timing information and to generate a second PRC signal based on the timing information and a second clock signal that is synchronous to the first clock signal, the second PRC signal traceable to the first PRC signal.

2. The system of claim 1, wherein the timing analyzer is configured to packetize the timing information into at least one timing packet, and wherein the interface is configured to transmit the at least one timing packet via the data stream to the first interworking function.

3. The system of claim 1, wherein the first interworking function is configured to control a period of the second PRC signal based on the timing information and the second clock signal.

4. The system of claim 1, wherein the timing analyzer is configured to determine a value indicating a number of cycles occurring in the first clock signal received by the timing analyzer during at least one cycle of the PRC signal, and wherein said timing information is based on the value.

5. The system of claim 1, wherein the timing analyzer comprises a counter configured to receive the first clock signal.

6. The system of claim 5, wherein the timing analyzer comprises a latch coupled to the counter, and wherein the latch is configured to latch a value from the counter based on the first PRC signal.

7. The system of claim 6, wherein the timing analyzer comprises a packet formatter configured to receive the value and to packetize the timing information, wherein the timing information is based on the value.

8. A communication system, comprising:

an interworking function; and a packet network having an interface configured to transmit a stream of data packets to the interworking function, the packet network having a timing analyzer configured to receive a first clock signal and a first primary reference clock (PRC) signal, the stream of data packets synchronous to the first clock signal, the timing analyzer further configured to transmit timing information indicative of a timing relationship between the first clock signal and the PRC signal, wherein the timing analyzer comprises a counter and a latch coupled to the counter, the counter configured to receive the first clock signal and the latch configured to latch a value from the counter based on the first PRC signal, wherein the interworking function is configured to receive the timing information and to generate a second PRC signal based on the timing information and a second clock signal that is synchronous to the first clock signal, the second PRC signal traceable to the first PRC signal, and wherein the timing analyzer comprises a packet formatter configured to packetize the timing information into a plurality of timing packets and to transmit the plurality of a timing packets in a sequence, the packet formatter configured to include a respective sequence indicator in each of the timing packets based on the sequence, wherein the interworking function comprises a buffer for storing the plurality of timing packets and a receiver, the receiver configured to receive the plurality of timing packets and to store the plurality of timing packets in the buffer based on the sequence indicator of each respective timing packet.

9. The system of claim 8, wherein the interworking function comprises a packet processor configured to retrieve a plurality of timing packets from the buffer based on an age of each respective timing packet stored in the buffer and to extract timing information from the plurality of retrieved timing packets, the interworking function further comprising a clock reconstructor configured to control a period of the second PRC signal based on the extracted timing information and the second clock signal.

10. A communication system, comprising:

an interworking function;

a packet network having an interface configured to transmit a stream of data packets to the interworking function, the packet network having a timing analyzer configured to receive a first clock signal and a first primary reference clock (PRC) signal, the stream of data packets synchronous to the first clock signal, the timing analyzer further configured to transmit timing information indicative of a timing relationship between the first clock signal and the PRC signal, wherein the interworking function is configured to receive the timing information and to generate a second PRC signal based on the timing information and a second clock signal that is synchronous to the first clock signal, the second PRC signal traceable to the first PRC signal; and an integrated circuit (IC), wherein the interface resides on the IC, the IC having an input port and an output port, each of the ports coupled to the timing analyzer.

11. The system of claim 10, wherein the IC is mounted on a first printed circuit board (PCB), and wherein the timing analyzer is mounted on a second PCB.

12. The system of claim 1, wherein the first interworking function is configured to enable synchronization between a first service clock signal and a second service clock signal based on the second PRC signal.

13. The system of claim 12, wherein the first interworking function is configured to define timing information indicative of a timing of the first service clock signal relative to the second PRC signal.

14. The system of claim 12, wherein the first interworking function is configured to receive a data signal and to generate the first service clock signal based on the data signal, the interworking function further configured to transmit timing packets indicative of timing relationships between the first service clock signal and the second PRC signal, thereby enabling a second interworking function to generate the second service clock signal.

15. The system of claim 12, wherein the first interworking function is configured to receive timing packets indicative of a timing of the first service clock signal relative to a PRC signal, the first interworking function further configured to generate the second service clock signal based on the timing packets and the second PRC signal.

16. The system of claim 1, wherein the first interworking function is configured to generate the second clock signal based on the stream of data packets.

17. A communication system, comprising:

a first interworking function configured to receive a data signal that is synchronous to a first service clock signal;

a second interworking function; and a packet network coupled to the first and second interworking functions, the packet network having a first interface coupled directly to the first interworking function, the interface configured to communicate with the first interworking function a stream of data packets synchronous to a first clock signal, the packet network having a timing analyzer configured to provide a plurality of timing packets indicative of a timing of a first primary reference clock (PRC) signal relative to the first clock signal, the interface configured to transmit the timing packets within the stream of data packets to the first interworking function, wherein the first interworking function is configured to receive the timing packets and to generate, based on the timing packets and a second clock signal synchronous to the first clock signal, a second PRC signal that is traceable to the first PRC signal, wherein the first interworking function is configured to transmit timing information to the second interworking function, the timing information indicative of a timing of the first service clock signal relative to the second PRC signal, and wherein the second interworking function is configured to generate, based on the timing information, a second service clock signal that is synchronous to the first service clock signal.

18. The system of claim 17, wherein the first interworking function is configured to generate the second clock signal based on the stream of data packets.

19. The system of claim 17, wherein the timing analyzer comprises a counter configured to count edges of the first clock signal, wherein each of the timing packets is based on a respective count value from the counter.

20. A communication system, comprising:

a first interworking function;

a second interworking function configured to receive a data signal that is synchronous to a first service clock signal; and a packet network coupled to the first and second interworking functions, the packet network having an interface coupled directly to the first interworking function, the interface configured to communicate with the first interworking function a stream of data packets synchronous to a first clock signal, the packet network having a timing analyzer configured to provide a plurality of timing packets indicative of a timing of a first primary reference clock (PRC) signal relative to the first clock signal, the interface configured to transmit the timing packets with the stream of data packets to the first interworking function, wherein the first interworking function is configured to receive the timing packets and to generate, based on the timing packets and a second clock signal synchronous to the first clock signal, a second PRC signal that is traceable to the first PRC signal, wherein the second interworking function is configured to transmit timing information to the first interworking function, the timing information indicative of a timing of the first service clock signal relative to the second PRC signal, and wherein the first interworking function is configured to generate, based on the timing information, a second service clock signal that is synchronous to the first service clock signal.

21. The system of claim 20, wherein the first interworking function is configured to generate the second clock signal based on the stream of data packets.

22. The system of claim 20, wherein the timing analyzer comprises a counter configured to count edges of the first clock signal, wherein each of the timing packets is based on a respective count value from the counter.

23. A communication method, comprising the steps of:

transmitting a data signal defining a data stream between a packet network and the first interworking function;

controlling a timing of the data signal based on a first clock signal such that the data signal is synchronous to the first clock signal;

providing timing information indicative of a timing of the first clock signal relative to a first primary reference clock (PRC) signal;

receiving, at the first interworking function, the timing information from the packet network; and generating a second PRC signal at the first interworking function based on the timing information and a second clock signal that is synchronous to the first clock signal, wherein the second PRC signal is traceable to the first PRC signal.

24. The method of claim 23, further comprising the step of generating the second clock signal based on the data stream.

25. The method of claim 23, further comprising the step of counting edges of the first clock signal, wherein the first timing information is based on the counting step.

26. The method of claim 23, further comprising the steps of:

packetizing the first timing information into at least one timing packet; and transmitting the at least one timing packet via the data stream to the first interworking function.

27. A communication method, comprising the steps of:

transmitting a data stream between a packet network and an interworking function;

controlling a timing of the data stream based on a first clock signal;

providing timing information indicative of a timing of the first clock signal relative to a first primary reference clock (PRC) signal;

transmitting the timing information from the packet network to the interworking function;

generating a second PRC signal based on the timing information and a second clock signal that is synchronous to the first clock signal;

packetizing the timing information into a plurality of timing packets;

storing the plurality of timing packets to a buffer based on a transmission sequence of the timing packets; and retrieving a plurality of timing packets from the buffer based on a respective age of each of the retrieved timing packets, wherein the generating step is based on each of the retrieved timing packets.

28. The system of claim 1, further comprising a second interworking function, wherein the first interworking function is configured to receive a data signal that is synchronous to a first service clock signal, wherein the first interworking function is configured to transmit, to the second interworking function through the packet network, timing information indicative of a timing relationship between the first service clock signal and the second PRC signal, wherein the second interworking function is configured to generate, based on the timing information indicative of the timing relationship between the first service clock signal and the second PRC signal, a second service clock signal that is synchronous to the first service clock signal.

29. The system of claim 1, wherein the packet network has a network switch, the network switch comprising the interface.

30. The system of claim 1, wherein the first clock signal is an Ethernet clock signal used for communication between the interface and the first interworking function.

31. The system of claim 30, wherein the data signal is an Ethernet data signal, and wherein the timing information is embedded in the Ethernet data signal.

32. The system of claim 1, wherein the first interworking function is configured to generate the second clock signal based on the data signal.

33. The system of claim 1, wherein the interface is configured to generate the first clock signal based on a data signal transmitted from the first interworking function to the interface.

34. The method of claim 23, further comprising the steps of:

receiving, at the first interworking function, a data signal that is synchronous to a first service clock signal;

providing timing information indicative of a timing of the first service clock signal relative to the second PRC signal; and transmitting, from the first interworking function through the packet network to a second interworking function, the timing information indicative of the timing of the first service clock signal relative to the second PRC signal.

35. The method of claim 34, further comprising the step of generating, at the second interworking function and based on the timing information indicative of the timing of the first service clock signal relative to the second PRC signal, a second service clock signal that is synchronous to the first service clock signal.

* * * * *

UNITED STATES PATENT AND TRADEMARK OFFICE

CERTIFICATE OF CORRECTION

PATENT NO. : 7,742,505 B2
APPLICATION NO. : 11/639401
DATED : June 22, 2010
INVENTOR(S) : Venters et al.

It is certified that error appears in the above-identified patent and that said Letters Patent is hereby corrected as shown below:

Please make the following correction on Page 18, Column 16, Claim 8:

8. A communication system, comprising:
an interworking function; and
a packet network having an interface configured to transmit a stream of data packets to the interworking function, the packet network having a timing analyzer configured to receive a first clock signal and a first primary reference clock (PRC) signal, the stream of data packets synchronous to the first clock signal, the timing analyzer further configured to transmit timing information indicative of a timing relationship between the first clock signal and the PRC signal, wherein the timing analyzer comprises a counter and a latch coupled to the counter, the counter configured to receive the first clock signal and the latch configured to latch a value from the counter based on the first PRC signal, wherein the interworking function is configured to receive the timing information and to generate a second PRC signal based on the timing information and a second clock signal that is synchronous to the first clock signal, the second PRC signal traceable to the first PRC signal, and wherein the timing analyzer comprises a packet formatter configured to packetize the timing information into a plurality of timing packets and to transmit the plurality of [[a]] timing packets in a sequence, the packet formatter configured to include a respective sequence indicator in each of the timing packets based on the sequence, wherein the interworking function comprises a buffer for storing the plurality of timing packets and a receiver, the receiver configured to receive the plurality of timing packets and to store the plurality of timing packets in the buffer based on the sequence indicator of each respective timing packet.

Signed and Sealed this
Eighth Day of March, 2011

David J. Kappos
*Director of the United States Patent and Trademark Office*

UNITED STATES PATENT AND TRADEMARK OFFICE

CERTIFICATE OF CORRECTION

PATENT NO. : 7,742,505 B2
APPLICATION NO. : 11/639401
DATED : June 22, 2010
INVENTOR(S) : Venters et al.

It is certified that error appears in the above-identified patent and that said Letters Patent is hereby corrected as shown below:

Column 16, line 39 - Column 17, line 3, Claim 8 should read as follows

8. A communication system, comprising:
an interworking function; and
a packet network having an interface configured to transmit a stream of data packets to the interworking function, the packet network having a timing analyzer configured to receive a first clock signal and a first primary reference clock (PRC) signal, the stream of data packets synchronous to the first clock signal, the timing analyzer further configured to transmit timing information indicative of a timing relationship between the first clock signal and the PRC signal, wherein the timing analyzer comprises a counter and a latch coupled to the counter, the counter configured to receive the first clock signal and the latch configured to latch a value from the counter based on the first PRC signal, wherein the interworking function is configured to receive the timing information and to generate a second PRC signal based on the timing information and a second clock signal that is synchronous to the first clock signal, the second PRC signal traceable to the first PRC signal, and wherein the timing analyzer comprises a packet formatter configured to packetize the timing information into a plurality of timing packets and to transmit the plurality of timing packets in a sequence, the packet formatter configured to include a respective sequence indicator in each of the timing packets based on the sequence, wherein the interworking function comprises a buffer for storing the plurality of timing packets and a receiver, the receiver configured to receive the plurality of timing packets and to store the plurality of timing packets in the buffer based on the sequence indicator of each respective timing packet.

This certificate supersedes the Certificate of Correction issued March 8, 2011.

Signed and Sealed this
Twenty-ninth Day of March, 2011

David J. Kappos
*Director of the United States Patent and Trademark Office*